United States Patent [19]
Goya

[11] Patent Number: 5,845,453
[45] Date of Patent: Dec. 8, 1998

[54] JOINTING METAL FITTING FOR BUILDINGS

[75] Inventor: Shigeo Goya, Naha, Japan

[73] Assignee: Kuretec Limited Company, Naha, Japan

[21] Appl. No.: 709,829

[22] Filed: Sep. 10, 1996

[30] Foreign Application Priority Data

Sep. 19, 1995 [JP] Japan ..................................... 7-240221
Apr. 11, 1996 [JP] Japan ..................................... 8-114161

[51] Int. Cl.⁶ ....................................................... E04B 1/38
[52] U.S. Cl. ............................. 52/702; 52/656.9; 52/712; 403/189; 403/246; 403/232.1; 248/243; 248/247
[58] Field of Search ............................. 52/702, 712, 713, 52/656.9, 696; 403/189, 246, 382, 292, 232.1; 248/243, 247, 250, 222.12

[56] References Cited

U.S. PATENT DOCUMENTS

| | | |
|---|---|---|
| 1,245,537 | 11/1917 | Van Fleet . |
| 4,068,332 | 1/1978 | Ball et al. ..................................... 5/296 |
| 4,114,861 | 9/1978 | Long ......................................... 256/67 |
| 4,223,866 | 9/1980 | Black ....................................... 249/111 |
| 4,545,167 | 10/1985 | Brock ........................................ 52/509 |
| 4,611,948 | 9/1986 | Johnson ................................. 403/232.1 |
| 5,062,733 | 11/1991 | Cholid et al. ............................ 403/189 |
| 5,228,261 | 7/1993 | Watkins .................................... 52/702 |
| 5,284,311 | 2/1994 | Baer ........................................ 248/243 |
| 5,295,754 | 3/1994 | Kato ......................................... 403/174 |
| 5,438,811 | 8/1995 | Goya ......................................... 52/702 |
| 5,590,503 | 1/1997 | Spronken ................................. 52/677 |
| 5,617,694 | 4/1997 | Baba ......................................... 52/712 |

Primary Examiner—Christopher Kent
Assistant Examiner—Yvonne Horton-Richardson
Attorney, Agent, or Firm—Kanesaka & Takeuchi

[57] ABSTRACT

A jointing metal fitting for joining wooden members in buildings is formed of a metal fitting main body having a U-shaped cross section, a securing device for securing the metal fitting main body to a first wooden member, and an axial securing device for securing a second wooden member to the metal fitting main body. The metal fitting main body includes a plate-like back section to be secured to the first wooden member, a plate-like holder section to be secured to the second wooden member, and a plate-like side section for linking the side of the back section and the side of the holder section. An axial securing groove is formed in the holder section to have an upper part opened to an upper end of the holder section. The first and second wooden members can be firmly and easily joined by the metal fitting.

7 Claims, 15 Drawing Sheets

JOINTING METAL FITTING FOR BUILDINGS

BACKGROUND OF THE INVENTION

1. Field of the Invention:

The present invention relates to a jointing metal fitting used for jointing a vertical wooden member and a lateral wooden member such as a beam, joist, foundation, or sleeper, or for joining lateral wooden members, such as a beam and a joist or a foundation and a sleeper.

2. Discussion of the Background:

Traditional wooden frame construction requires complicated technique for fabricating frameworks and special processes for connecting or jointing various wooden members. This work is inefficient, requires a long time to perform, and increases the construction costs, because these sophisticated techniques require skilled carpenters and craftsman.

For these reasons, in recent years the work for making connections and joints is saved or simplified by standardizing wooden components and their jointing structures by using jointing metal fittings to connect these wooden components. These connections are processed in workshops beforehand. Wooden components can be jointed one by one at the construction site.

A framework can be efficiently constructed at the construction site without using any special technique or process by means of this engineering method using this type of jointing metal fitting.

A jointing metal fitting for a column and a beam disclosed in Japanese Utility Model Laid-open (kokai) No. 041002/1992 can be given as an example of a jointing metal fitting used in this type of wooden frame engineering method.

FIG. 16 is an exploded perspective view showing a conventional jointing metal fitting for buildings disclosed by Japanese Utility Model Laid-open (kokai) No. 041002/1992.

As shown in FIG. 16, this jointing metal fitting disclosed by Japanese Utility Model Laid-open (kokai) No. 041002/1992 comprises a fitting plate 1 secured to the side of a column 100 and a pair of guide side plates 2 which are formed by bending both ends of the fitting plate 1 at right angle so that these guide side plates project forward.

Provided in the central part of the fitting plate 1 are a fitting hole 1a through which a clamping instrument 3, which passes through a column 100, penetrates and an indented section 1b which digs into the side of the column 100 at the top of the fitting plate 1.

In addition, a plurality of insert through-holes 2a are formed in the pair of guide side plates 2 through which a pin 4 penetrates a beam 200. Upper insert through-holes 2a is groove-like holes with the upper portion open.

By means of the jointing metal fitting of Japanese Utility Model Laid-open No. 041002/1992, after the fitting plate 1 is secured to the side of the column 100 connection sections formed at the end of the beam 200 are inserted through the guide side plated 2 and the pin 4 is inserted from the side of the beam 200 to cause this pin to penetrate the insert through-holes 2a of the guide side plate 2, whereby the column 100 and the beam 200 can be easily joined.

However, when using this jointing metal fitting disclosed by Japanese Utility Model Laid-open No. 041002/1992, wooden members are jointed only by means of the insertion of guide side plates into connection sections of the beam in the longitudinal direction of the beam, so that the beam cannot be sufficiently jointed to the column by clamping it to the column side.

In particular, wooden components shrink by drying and the like with time after a wooden building has been constructed, creating gaps between the connection sections of the wooden components. It is impossible to fill the gaps by adjusting the amount of clamping in this conventional jointing metal fitting.

On the other hand, because the guiding side plate in this conventional jointing metal fitting consists of a pair of plate members arranged in parallel, a pair of grooves corresponding to the guiding side plate must be provided in the connection part at the end of the beam through which the guiding side plate is passed. This requires additional work to process the connection parts.

In particular, in the case where the wooden component such as a beam and the like is a composite material, an extremely hard wooden component may damage a tool used for producing grooves which make up the connection parts.

In view of this situation, the inventors of the present invention have proposed a jointing metal fitting for buildings which is relatively free from the problems in Japanese Utility Model Laid-open No. 011811/1992.

FIG. 17 is an exploded perspective view showing the jointing metal fitting for buildings proposed by the inventors of the present invention.

As shown in this figure, the proposed jointing metal fitting for buildings consists of a box type main member 5 and a jointing member 6 which is a pipe secured to the main member 5 by means of a wedge 7. The back 5a of the main member 5 is secured to a column 100 using a bolt or the like, and the jointing member 6 is inserted into a beam 200 and secured using a bolt 8. Then, this jointing member 6 is secured to the main member 5 using the wedge 7 to firmly connect the column 100 and the beam 200.

According to this jointing metal fitting, a major connecting operation for a beam 200 consists only of a relatively large operation for inserting the box type main member into the beam. Moreover, since a jointing member with a large diameter is driven into lateral components, such as a beam or a joist, to secure them, a strong bonding force is obtained. Thus, the above-mentioned problems in the jointing metal fitting of Japanese Utility Model Laid-open No. 041002/1992 have been eliminated from this jointing metal fitting.

However, even with this jointing metal fitting a lengthwise connecting operation is still necessary for the connection section of a beam. It is difficult to fill a large gap when such a gap is created in the connection sections of wooden components. Thus, there is a room for improvement in this jointing metal fitting.

The present invention has been completed in order to solve the problems inherent in such conventional techniques, and has an object of providing a jointing metal fitting which can strongly and firmly join wooden components by a very simple process for connecting wooden components without producing groove-like connections, and can increase a tightening force between the wooden components by sufficient clamping when a gap is produced between the connection sections and the wooden components after jointing, and permit framework fabrication to be easily and safely conducted.

SUMMARY OF THE INVENTION

In order to achieve these objects, the jointing metal fitting of the present invention used for joining wooden components in a wooden building comprises (1) a metal fitting main body with a U-shaped cross section, which is made up of a plate-like back section secured to a first wooden component, a plate-like holder section secured to another, second wooden component arranged to oppose the plate-like back section, and a plate-like side section which links said back section and a side of said holding section, (2) a securing bolt which secures said back section of the metal fitting main body to said first wooden component, and (3) an axial securing means which secures said second wooden component to the holder section of the metal fitting main body.

In this instance, said holder section of the metal fitting main body is preferably provided with a cogged joint groove of which the upper part is opened up to the upper end of said holder section and/or a securing hole through which said axial securing means penetrates.

In one embodiment of the present invention, the above-mentioned axial securing means for the jointing metal fitting for buildings is provided with a screw on one end of its external circumference and, on the other end, with an axial member which is inserted from a connection section of said other wooden component through which a pin hole crossing at right angles to the axial direction is provided, a nut threadedly engaging the screw of said axial member, and a pin driven from the side of said second wooden component and penetrating the pin hole of said axial member, or, alternatively, provided with a screw on one end of its internal circumference, and, on the other end, with an axial member with at least one hollow end which is inserted from a connection section of said other wooden component through which a pin hole crossing at right angles to the axial direction is provided, a bolt threadedly engaging the screw of said axial member, and a pin driven from the side of said second wooden component and penetrating the pin hole of said axial member.

Moreover, in still another embodiment, the jointing metal fitting for buildings of the present invention has a metal fitting main body which is provided with a bottom plate covering the base thereof, the bottom plate projecting on the side of the holder section of said metal fitting main body and maintaining the lower end of a connection section of said second wooden component, and a barb inclined upward is provided projecting from the tip of the bottom plate.

According to the jointing metal fitting for buildings of the present invention with this construction, because the metal fitting main body are provided between wooden components to be joined, no gap is produced between the wooden components when the securing bolt for securing the metal fitting main body to wooden components and the axial securing means are clamped. In addition, a gap which may be produced by shrinkage of wooden components after jointing can be easily reduced by simply increasing the amount of clamping of the metal fitting main body.

Moreover, because installation to wooden components is performed only by a securing bolt consisting of a bolt and a rod component and an axial securing means in the jointing metal fitting of the present invention, only a hole opening process is necessary for providing connections to wooden components. Therefore, the connection process is very simple even when the wooden component used is a composite material. There is no difficulty in the connection process such as damage to tools which is experienced by conventional jointing metal fittings.

In addition, because the bottom surface of the metal fitting main body can be covered and the lower edge of the connection section of wooden components is secured by providing a bottom plate on the metal fitting main body, metal fittings are not exposed which helps to maintain a beautiful external appearance of the building, while ensuring a strong joining force between the wooden components. The intensity of the metal fitting main body itself is also increased.

In particular, provision of the projecting barb inclined upward at the end of the bottom plate ensures that the wooden components are guided by the berb, which makes it possible for the metal fitting main body and the wooden components to be firmly secured.

Moreover, the jointing metal fitting for buildings of the present invention may be provided with not only the bottom plate which covers the bottom of the metal fitting main body, but also with an anchor bolt hole which penetrates this bottom plate.

By providing the anchor bolt hole in the bottom plate of the metal fitting main body in this manner, this anchor bolt hole is penetrated by the upper end of an anchor bolt which was driven into the foundation of a building. This ensures that the metal fitting main body is secured to the foundation.

In addition, by causing an anchor bolt to penetrate the bottom plate in this manner, it is possible to secure the back of the metal fitting main body to a column, and, at the same time, to secure the side of a holder section to the connection section which is on a platform of the foundation. In this manner, the column, platform, and foundation are solidly and integrally joined by the jointing metal fitting of the present invention.

In one preferred embodiment, the jointing metal fitting for buildings of the present invention is provided with a holder plate outwardly projecting from the lower end of the holder section and, further provided with a projecting barb inclined upward at the upper end of this holder plate.

By providing the holder plate in the holder section of the metal fitting main body in this manner it is possible to maintain the base of a crosspiece component by the holder plate and to allow the barb to engage the wooden components, whereby the metal fitting main body can be firmly secured to the wooden components.

These arrangements have made it possible for a lateral component such as a sleeper which conventionally requires support from underneath to be firmly jointed with a column without providing a means of lower support.

DETAILED DESCRIPTION OF THE INVENTION AND PREFERRED EMBODIMENTS

Figure 1:
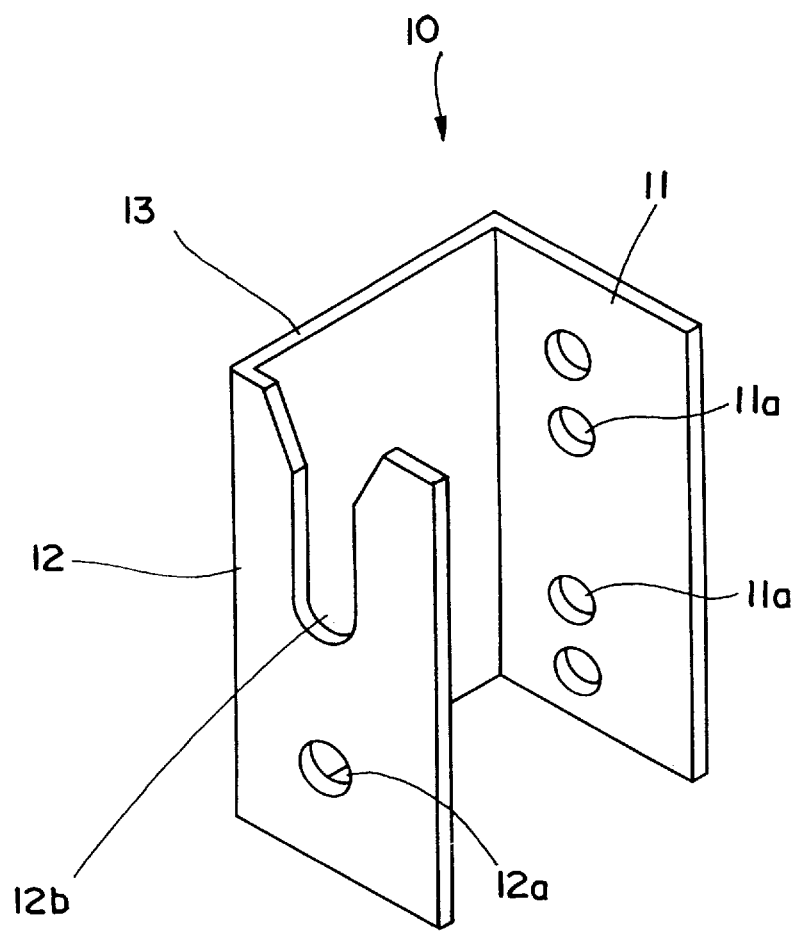
FIG. 1 is a perspective view which shows a whole metal fitting main body in the first embodiment of the jointing metal fitting for buildings of the present invention.

Preferred embodiments of the jointing metal fitting for buildings of the present invention will be illustrated referring to the drawings.

A first embodiment

A first embodiment of the jointing metal fitting for buildings of the present invention will be illustrated.

Figure 2:
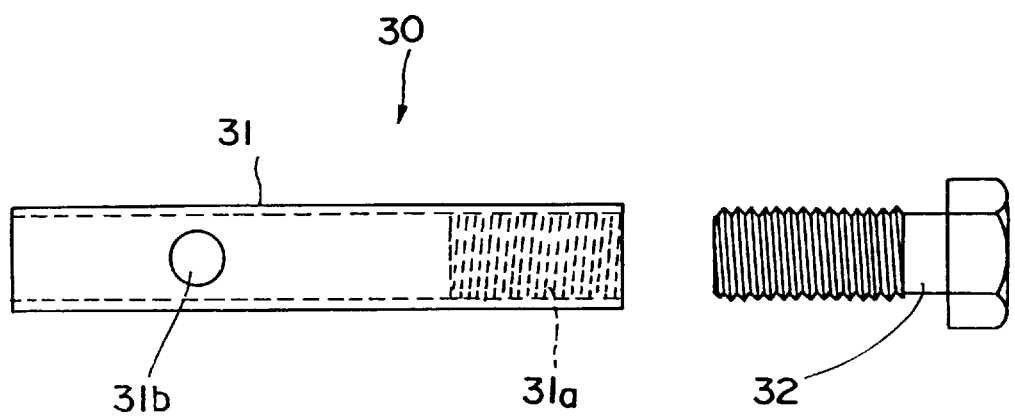
FIG. 2 is a side-view of an axial securing means in the first embodiment of the jointing metal fitting for buildings of the present invention.
Figure 3:
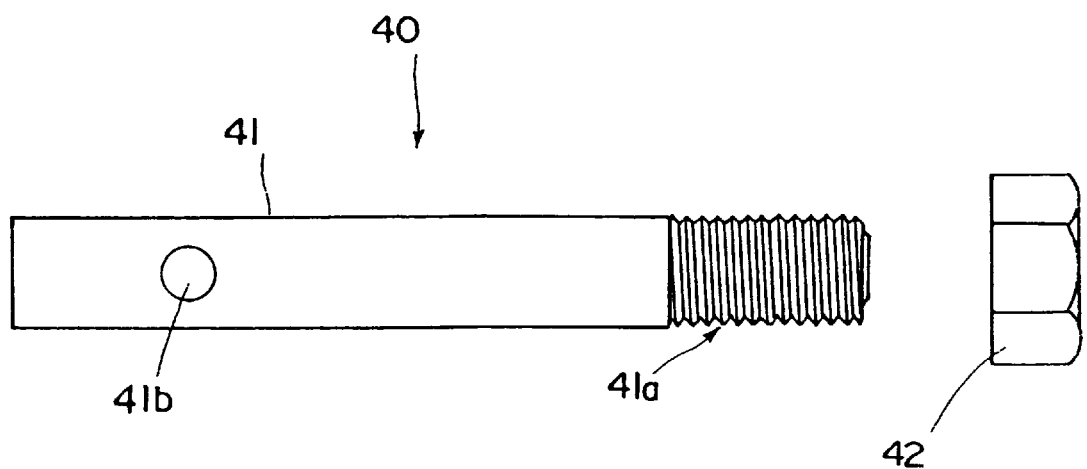
FIG. 3 is a side-view of an axial securing means in the first embodiment of the jointing metal fitting for buildings of the present invention.

FIG. 1 is a perspective view showing the whole metal fitting main body in the first embodiment of the jointing metal fitting of the present invention, and FIG. 2 and FIG. 3 are front views which show examples of axial securing means.

Figure 4:
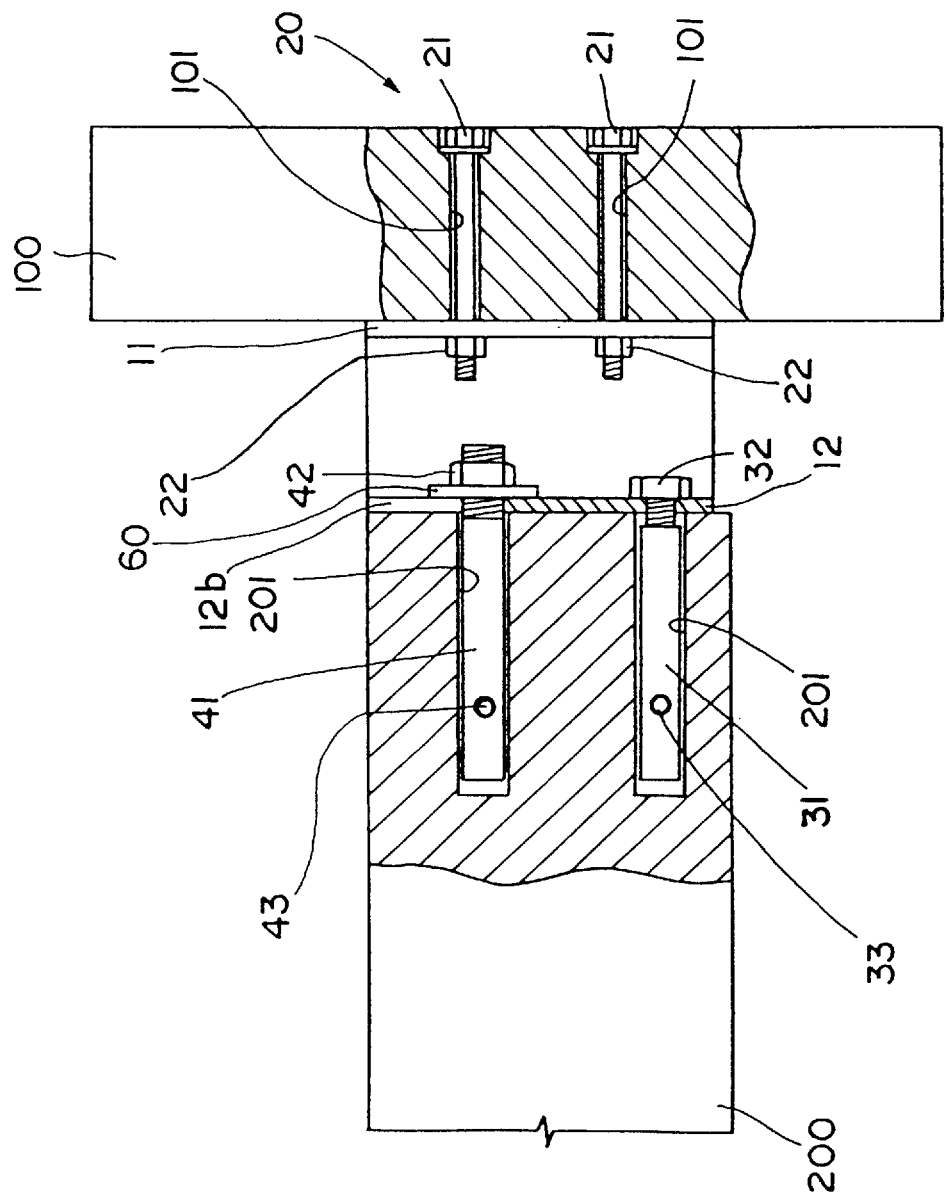
FIG. 4 is a partially cut side-view showing wooden components joined together by the jointing metal fitting of the first embodiment of the present invention.
Figure 5:
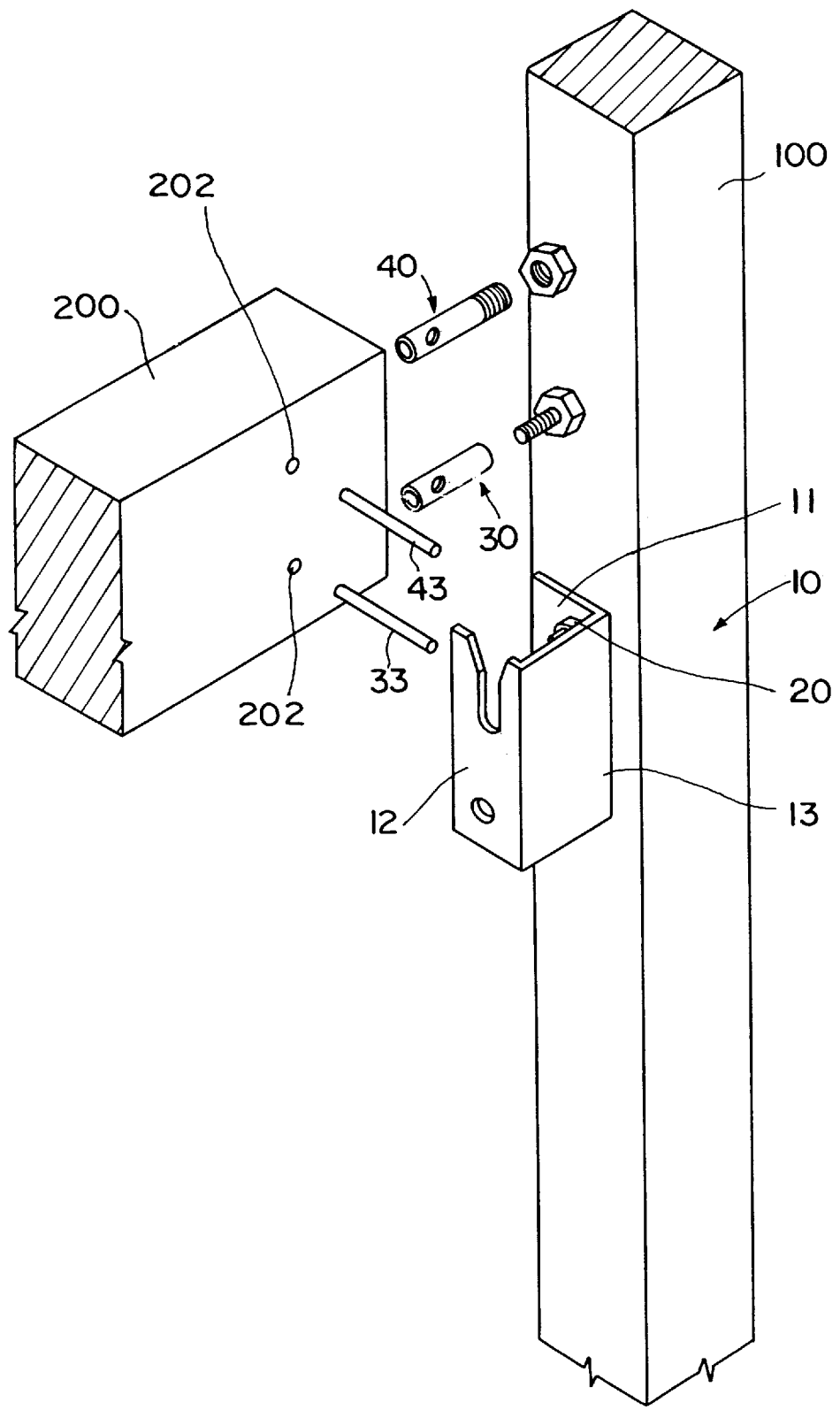
FIG. 5 is an exploded perspective view showing wooden components being jointed by the jointing metal fitting of the first embodiment of the present invention.

FIG. 4 is a partially cut side-view of the condition wherein the wooden components have been joined by the jointing metal fitting of this embodiment and FIG. 5 is the an exploded perspective view showing wooden components joined by the jointing metal fitting of this embodiment.

As shown in these Figures, the jointing metal fitting of this embodiment is used to join a lateral wooden component such as a beam or a joist to a vertical wooden component such as a column, or to join lateral components such as a beam and a joist. Shown in FIG. 4 and FIG. 5 are the cases where a beam 200 which is a lateral wooden component is joined with a column 100 which is a vertical wooden component.

The jointing metal fitting of this embodiment consists of a metal fitting main body 10 which joins both wooden components, and axial securing means 30,40 which are inserted into the side of a securing bolt 20, which penetrates through the side of column 100 to secure the metal fitting main body 10 and both wooden components, and also into the side of a beam 200.

<Metal fitting main body>

The metal fitting main body is first illustrated.

As shown in FIG. 1, the metal fitting main body 10 consists of a plate-like back section 11 to be secured to one side of a column 100, a plate-like holder section 12 provided opposing the back section 11, and a plate-like side section 13 which is positioned between the back section 11 and the holder section 12. The both sides of the side section 13 are in contact with the back section 11 and one side of the holder section 12, whereby the jointing metal fitting forms a U-shaped cross section as a whole.

This metal fitting main body 10 may be made from independent plate-like members for forming the back section 11, the holder section 12, and the side section 13 by joining these members by welding or the like. However, it is preferable from the viewpoint of rigidity and ease of fabrication to produce the metal fitting main body 10 from one sheet of metal plate such as an iron plate by bending the metal plate to form a U-shaped cross section.

The metal fitting main body 10 in this embodiment is also formed by bending a sheet of plate-like member.

Formed on the back section 11 of this metal fitting main body 10 are bolt through-holes 11a which allow securing bolts 20 to penetrate therethrough, as discussed later. In the embodiment shown in FIG. 1, four bolt through-holes 11a are arranged vertically along the back section 11.

The number of the bolt through-holes la can be optionally determined depending on the height, weight, or the like of the joined wooden components. From the viewpoint of ensuring wide and general use of the jointing metal fitting, it is desirable to provide two or more bolt through-holes.

A bolt securing hole 12a is provided in the lower side of a holder section 12 which opposes the back section 11, and in the upper side of the holder section 12 is formed an axial securing groove 12b, which is an aperture opening up to the upper end of the holder section 12 and acting as a cogged joint groove.

A securing bolt 32 for an employment pipe dowel 30, acting as an axial securing means as discussed later, penetrates this bolt securing hole 12a. One end of an employment axial dowel 40, acting as an axial securing means as discussed later, is provided engage the axial securing groove 12b.

Although one bolt securing hole 12a is provided on the lower side of the holder section 12 in FIG. 1, the number of the bolt securing holes 12a is optionally selected and a plurality of holes may be arranged vertically, depending on the height, weight, and the like of the joined wooden components, in the same manner as in the above-mentioned bolt through-hole 11a which is provided in the back section 11.

In addition, it is possible to make the metal fitting main body 10 sufficiently long in the vertical direction, as in the third embodiment which is illustrated later. In this instance, the number of bolt securing holes 12a can be also increased and it is possible to have a larger beam 200 or the like to be joined with the column 100.

Moreover, as discussed later, the beam 200 and the column 100 can be easily joined by providing an axial securing groove 12b in the form of a groove opened upward, so as to function as a cogged joint groove.

Although it is possible to form this axial securing groove 12b in the form or ordinary through-hole, not the cogged joint groove in the form of an upward opening aperture, it is desirable to have both the cogged joint groove and the through-hole juxtaposed for ease of operation and to improve the jointing strength between wooden components.

<Securing means>

Next, the securing means 20 which secures the metal fitting main body 10 to a column 100 is explained.

As shown in FIG. 4, the securing means 20 consists of a bolt 21 which is inserted from one side of the column 100 and penetrates this column 100, with the end projecting from the other side of the column, and a nut 22 which threadedly engages the end of this bolt 21. The end of the bolt 21, which penetrates column 100, passes through the bolt through-hole 11a which is formed on the back section 11 of the metal fitting main body 10 and, at the same time, a nut 22 threadedly engages the end of this bolt 21, whereby the metal fitting main body 10 is secured to one side of the column 100.

An optional number of securing means 20 corresponding to the number of bolt through-holes 11a of the metal fitting main body 10 may be provided. In this embodiment, there are provided two bolts 21 and two nuts 22 which threadedly engage the bolts.

<Axial securing means>

Next, the axial securing means which secures the holder section 12 of the metal fitting main body 10 and the beam 200 will be illustrated.

As shown in FIGS. 2, 3, and 4, two kinds of dowels, an employment pipe dowel 30 and an employment axial dowel 40, are used as the axial securing means in this embodiment.

First, the employment pipe dowel 30 which is shown in FIG. 2 is explained.

As explained later, a hollow axial member 31 which constitutes the employment pipe dowel 30 is inserted into a dowel insertion hole 201 which is formed in a connection section of the beam 200.

A screw 31a is formed around the inner circumference of one end of this axial member 31, and a pin hole 31b which penetrates the axial member 31 at right angles to the longitudinal direction thereof is provided on the other end.

This axial member 31 is usually cylindrical and is preferably made of steel.

A securing bolt 32 threadedly engages a screw 31a which is formed around the inner circumference of one end of the axial member 31.

A penetration pin 33 penetrates the pin hole 31b of the axial member 31 and, as discussed later, is driven from a pin through-hole 202 in the side of the beam 200 so as to pass through the pin hole 31b.

This penetration pin 33 is usually a round column made of steel, as discussed later, and preferably has a tapered tip so that the pin can be easily driven into the pin hole 31b from the beam 200.

The axial member 31 of this employment pipe dowel 30 has a cylindrical shape as mentioned above, but need not necessarily be cylindrical as a whole. That is to say, it is sufficient that the axial member 31 be capable of allowing the securing bolt 32 to threadedly engage its inner circumference. Therefore, any axial member with a cylindrical shape and a female thread for screwing the securing bolt 32 may be used.

Next, the employment shaft dowel 40 shown in FIG. 3 will be explained.

The axial member 41 which constitutes this employment shaft dowel 40 has a columnar shape and, in the same manner as in the case of the employment pipe dowel 30, is inserted into a dowel insertion hole 201 of a connection section of the beam 200 and is secured to the beam 200.

Formed around the external circumference of one end of this axial member 41 is a screw 41a, and on the other end a pin hole 41b is provided which penetrates the axial member 41 at right angles to the longitudinal axial direction of the axial member 41.

In the same manner as in the employment pipe dowel 30, it is desirable that this axial member 41 be made of steel.

A securing nut 42 is provided so as to threadedly engage the screw 41a on the external circumference of one end of the axial member 41.

A penetration pin 43 is driven from a pin through-hole 202 on the side of the beam 200, in the same manner as in the case of the employment pipe dowel 30, and is designed to penetrate the pin hole 41b of the axial member 41.

Although the axial member 41 of this employment axial dowel 40 has a columnar shape, the axial member 41 is not necessarily a column, but may be a hollow cylinder or the like, because the securing nut 42 threadedly engages the external circumference of the axial member 41.

In this instance, in order to increase the strength of the screw 41a side of the axial component 41, it is desirable to insert a round steel member or the like for reinforcement into a hollow part of the side where the screw 41a has been formed.

In addition, in the same manner as in the above-mentioned penetration pin 33, the penetration pin 43 is preferably made of steel with a tapered end in order to make it easy for the pin 43 to be driven into the pin hole 41b from the beam 200.

The employment pipe dowel 30 and the employment axial dowel 40 having the structures described above can be secured to the holder section 12 by causing these to penetrate or engage the bolt securing hole 12a formed in the above-mentioned holder section 12 and the axial securing groove 12b.

Specifically, because the employment pipe dowel 30 is configured so as to allow the securing bolt 32 to penetrate the bolt securing hole 12a which is provided below the holder section 12, this securing bolt 32 threadedly engages the screw 31a of the axial member 31, whereby the employment pipe dowel 30 is secured to the holder section 12.

Also, one end of the employment shaft dowel 40, on which a screw 41a of the axial component 41 is formed, directly engages the axial securing groove 12b in the form of a cogged joint groove which is formed on the upper side of the holder section 12, and allows the securing nut 42 to threadedly engage the screw 41a on one end of this axial component 41, whereby the employment shaft dowel 40 is firmly secured to the holder section 12.

Next, the use of the jointing metal fitting of this embodiment with the configulation mentioned above will be illustrated.

First of all, bolt holes 101 penetrating a column 100 from the side to which a metal fitting main body 10 is attached to the opposite side are formed so as to allow the bolts 21 of the securing means 20 to penetrate therethrough beforehand. Also, dowel insertion holes 201 for allowing the axial securing means 30,40 to be inserted into a connection section is formed in a beam 200 and, at the same time, pin through-holes 202 through which the penetration pins 33, 43 penetrate are formed in the side of the beam 200.

Next, bolts 21 of the securing means 20 are caused to penetrate the bolt holes 101 of the column 100, and through-hole 11a which are formed in the back section 11 of the metal fitting main body 10 are caused to engage the projecting ends of the bolts 21 after penetrating the column 100. Then, a nuts 22 are screwed onto the ends of the bolts 21.

In this instance, it is desirable that a washer be fitted onto the bolt 21 to prevent the bolts from being loosened.

The back section 11 of the metal fitting main body 10 is secured to one side of the column 100 in this manner.

Next, the axial members 31, 41 of the employment pipe dowel 30 and the employment axial dowel 40 are inserted into the dowel insertion holes 201 formed in the connection section of the beam 200 from the side in which the pin holes 31b, 41b are formed. Then, penetration pins 33, 43 are driven from the pin through-holes 202 on the side of the beam 200 to penetrate the pin holes 31b, 41b of the axial members 31, 41.

At this time, the employment axial dowel 40 is temporarily secured by the securing nut 42.

By means of this operation the employment pipe dowel 30 and the employment axial dowel 40 are tightly secured to the beam 200.

In this instance, as shown in FIG. 4, the employment pipe dowel 30 is inserted under the beam 200 and the employment axial dowel 40 is inserted from the upper side.

Because the operation up to this point can be carried out normally in pleasant working conditions such as in a workshop, complicated operations involving risks if performed at the construction site can be done in advance. This is advantageous from the viewpoint of safety and working efficiency.

At the construction site, the axial securing means 30, 40 penetrating the beam 200 are aligned so as to mate with the hole of the holder section 12 of the metal fitting main body 10 which is secured to the column 100, thereby joining the column 100 and the beam 200.

In this instance, because the employment axial dowel 40 inserted into the upper side of the beam 200 engages the axial securing groove 12b formed as cogged joint groove in the holder section 12, the jointing position can be easily mated, ensuring easy jointing of the beam 200.

In addition, because the securing nut 42 is temporarily securing the employment axial dowel 40, the beam 200 is not disconnected from the holder section 12, thereby ensuring safe and efficient execution of the operation.

Then, the securing bolt 32 is threadedly engaged to the screw 31a of the employment pipe dowel 30 from the opening opposite to the side section 13 of the metal fitting main body 10 and, at the same time, the nut 42 is tightened by screwing.

As shown in FIG. 4, in this embodiment an angle washer 60 is used to threadedly engage the securing nut 42 to the employment axial dowel 40. This ensures sufficient screwing force by the securing nut 42.

Joining of the column 100 and the beam 200 is completed by these operations.

It is desirable that a washer be present in the clamping parts of the jointing metal fitting in this invention, such as the nut 22, securing bolt 32, and securing nut 42 to prevent these parts from being loosened, although this is not specifically shown in the drawings.

In the wooden components which were joined in this manner, the beam 200 is strongly secured to a side of the column 100 via the metal fitting main body 10 and there is no possibility of a gap being produced between them because the metal fitting main body 10 lies between the column 100 and the beam 200.

In particular, because one end of the employment axial dowel 40 directly engages the axial securing groove 12b which is formed as a cogged joint groove in the holder section 12, the beam 200 is tightly secured to the metal fitting main body 10.

In addition, there is no possibility that the joining of wooden components loosen or produce a gap between them even if the wooden components shrink from drying or the like after joining, because the clamping quantity can be adjusted by tightening the nut 22, the securing bolt 32, and the securing nut 42 which secure the securing means 20, the employment pipe dowel 30, and the employment axial dowel 40 from the open surface on the opposite side of the side section 13 of the metal fitting main body 10.

Moreover, since installation of wooden components is performed only by the axial securing means 20, the employment pipe dowel 30, and the employment axial dowel 40 using the jointing metal fittings of this embodiment, the connection process of the column 100 and the beam 200 requires only production of holes or cavities.

Therefore, the connection is very simple and can be very easily performed even in the case where the wooden members are composite materials. There is no difficulty in making the connection and no problems arise such as damage to tools, which are encountered when using conventional jointing metal fittings.

Second embodiment

Next, a second embodiment of the jointing metal fitting for buildings of the present invention will be explained referring to FIG. 6 and FIG. 7.

Figure 6:
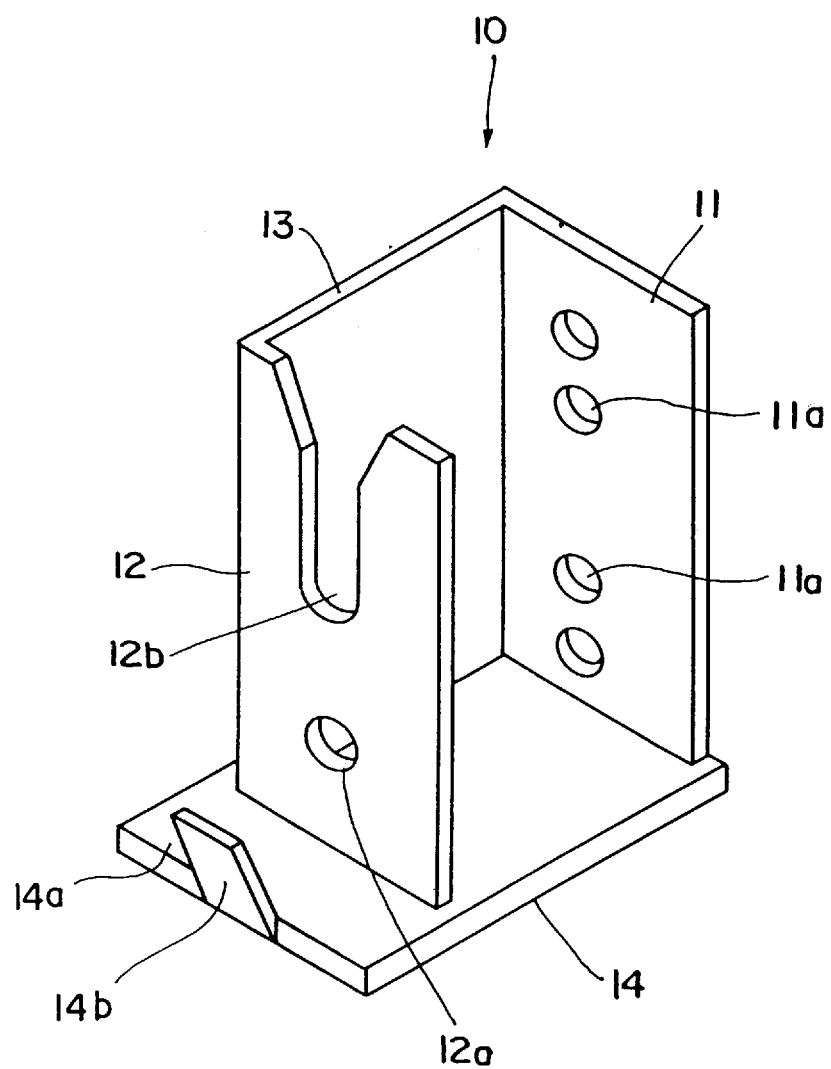
FIG. 6 is a perspective view which shows a whole metal fitting main body in the second embodiment of the jointing metal fitting for buildings of the present invention.
Figure 7:
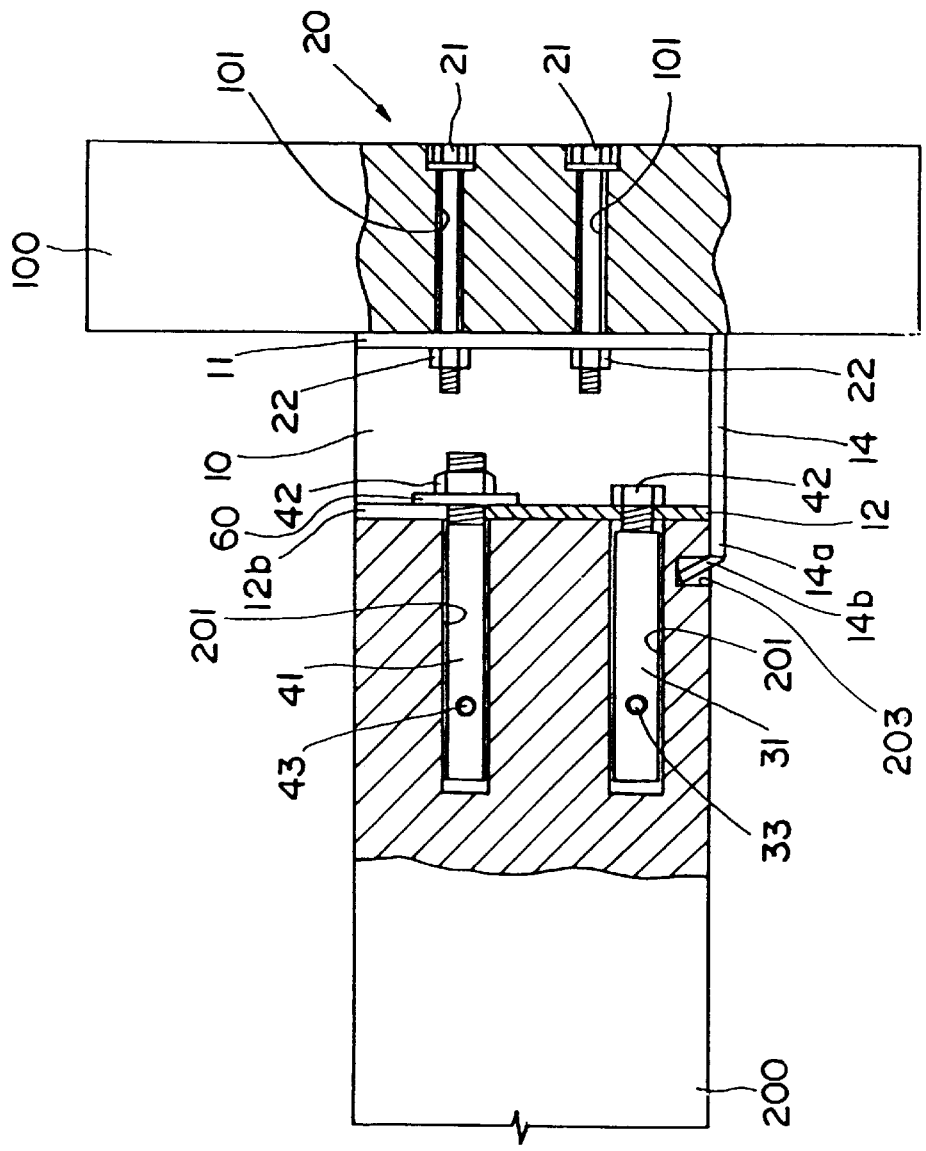
FIG. 7 is a partially cut side-view showing wooden components joined together by the jointing metal fitting of the second embodiment of the present invention.

FIG. 6 is a perspective view which shows the whole of the metal fitting main body of the second embodiment of the jointing metal fitting for buildings of the present invention and FIG. 7 is a partially cut side-view of the condition where wooden components have been joined by the jointing metal fitting of this embodiment.

As shown in these figures, the jointing metal fitting of this embodiment is a modification of the jointing metal fitting of the first embodiment which was discussed above and is different from the first embodiment in that this embodiment has a bottom plate 14 at the bottom of the metal fitting main body 10.

This bottom plate 14 is large enough to sufficiently cover the bottom of the metal fitting main body 10 as shown in FIG. 6 and is attached to the bottom surface of the metal fitting main body 10 by welding or the like.

One end of this bottom plate 14 forms a projecting section 14a which projects from the side of the holder section 12 of the metal fitting main body 10. This projecting section 14a functions as a supporting surface which holds the lower end of the connection section of the beam 200.

Here, this bottom plate 14 plays a role as a reinforcement component for the metal fitting main body 10 itself.

Specifically, the strength of the metal fitting main body 10 itself is improved by causing the bottom plate 14 to adhere to the bottom surface of the metal fitting main body 10, because the side section 13 can be secured integrally to the back section 11 and the holder section 12.

This prevents the metal fitting main body 10 from being twisted or bent, even if a twisting force is applied to the side section 13 of the metal fitting main body 10.

This bottom plate 14 also has the effect of more firmly joining the wooden components.

Specifically, since the bottom plate 14 is formed so that projection section 14a projects from the side of the holder section 12, the lower end of the connection section of the beam 200 is held by being supported by the projection section 14a as shown in FIG. 7.

This ensures that the bottom of the beam 200 is supported by the projection section 14a, even when the beam 200 receives a vertical weight. The joint between beam 200 and the column 100 is so formed that there will be no loosening between the beam 200 and the column 100.

Moreover, the bottom plate 14 enables the joining of the column 100 and the beam 200 to be performed under the condition wherein the lower end of the connection section of the beam 200 is set on the projecting section 14a of the bottom plate 14, whereby the labor required to hold the beam 200 is reduced and the jointing operation can be more easily performed.

In addition, this bottom plate 14 also functions as a makeup plate which covers the metal fitting main body 10.

In general, in a building using jointing metal fittings, the metal fittings are exposed at the joints between the wooden members. In particular, metal fittings in the jointing parts stand out in a building which does not have a ceiling, marring the outward appearance of the building.

The bottom plate 14 provided in the metal fitting main body 10 to cover the bottom surface thereof effectively prevents the metal fitting main body 10 from being exposed, thereby improving the external appearance of the building.

The bottom plate 14 can be omitted when the size of the beam 200 to be jointed is so small that there is no need for the bottom surface to be supported, or when the metal fitting main body 10 is used in a location not exposed to the outside, such as the back of the ceiling.

Furthermore, as shown in FIG. 6 and FIG. 7, the bottom plate 14 of the metal fitting main body 10 of this embodiment is provided with a cog joint 14b slantingly projecting upward from the tip thereof.

In this arrangement, as shown in FIG. 7, a notched section 203 which engages the cog joint 14b is formed on the bottom side of the connection section of the beam 200.

Alignment of the metal fitting main body 10 and the beam 200 at the time of jointing wooden members can be easily performed and workability and safety at the time of joining the wooden members can be ensured by providing the cog joint 14b projecting from the tip of the bottom plate 14 and causing this cog joint 14b to engage the notch 203 in the bottom of the beam 200.

Moreover, since the cog joint 14b is provided slantingly do project upward, when the beam 200 is set by dropping in the projecting section 14a of the bottom plate 14, the cog joint 14b guides the notch 203 so as to draw the beam 200 to the side of the metal fitting main body 10, whereby it becomes possible to firmly secure the beam 200 on the side of the metal fitting main body 10.

Third embodiment

A third embodiment of the jointing metal fitting for buildings of the present invention will be explained referring to FIG. 8 and FIG. 9.

Figure 8:
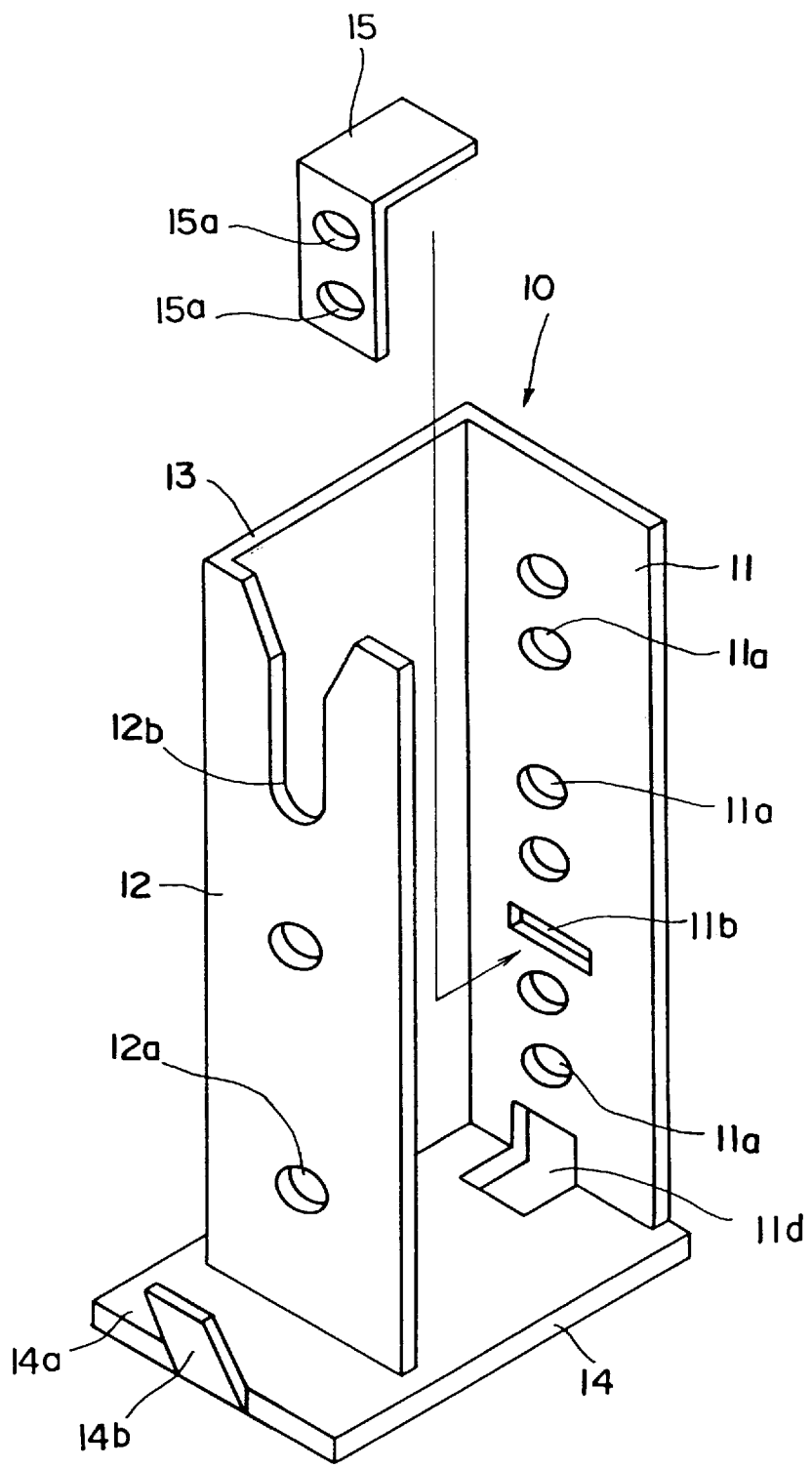
FIG. 8 is a perspective view which shows a whole metal fitting main body in the third embodiment of the jointing metal fitting for buildings of the present invention.

FIG. 8 is a perspective view which shows the metal fitting main body of the third embodiment of the jointing metal fitting for buildings of the present invention as a whole. FIG. 9 is a partial cut side view showing the condition where the metal fitting main body is attached to the column side when wooden members are jointed by the jointing metal fitting of this embodiment.

As shown in these Figures, the jointing metal fitting of this embodiment is a modification of the above-described jointing metal fitting of the second embodiment. Differences are that the metal fitting main body 10 in this third embodiment is made longer in the vertical direction and that a total of six bolt through-holes 11a are provided on the back section 11, two at the top, two in the middle, and two at the bottom.

In general, beams and columns differ according to the size of constructed buildings. Larger columns and beams are used for large buildings. It is desirable to increase the jointing strength of the jointing metal fitting of the above-mentioned first embodiment in proportion to the increase in the width, height, and weight of the beam.

For this reason, in the jointing metal fitting of this embodiment the metal fitting main body 10 is made longer in the vertical direction to ensure that even a large beam is strongly secured to a column.

The enlarged length of the metal fitting main body 10 and the increase in the number of bolt through-holes 11a on the back section 11 in this way make it possible for the metal fitting main body 10 to be secured by an increased number of securing means 20 and also increase the holding power of the beam 200.

Also, as shown in FIG. 8, because a cog joint 14b is provided projecting from the end of the bottom plate 14 of the jointing metal fitting in this embodiment in the same manner as in the second embodiment, it is possible to more securely join the wooden members.

Figure 9:
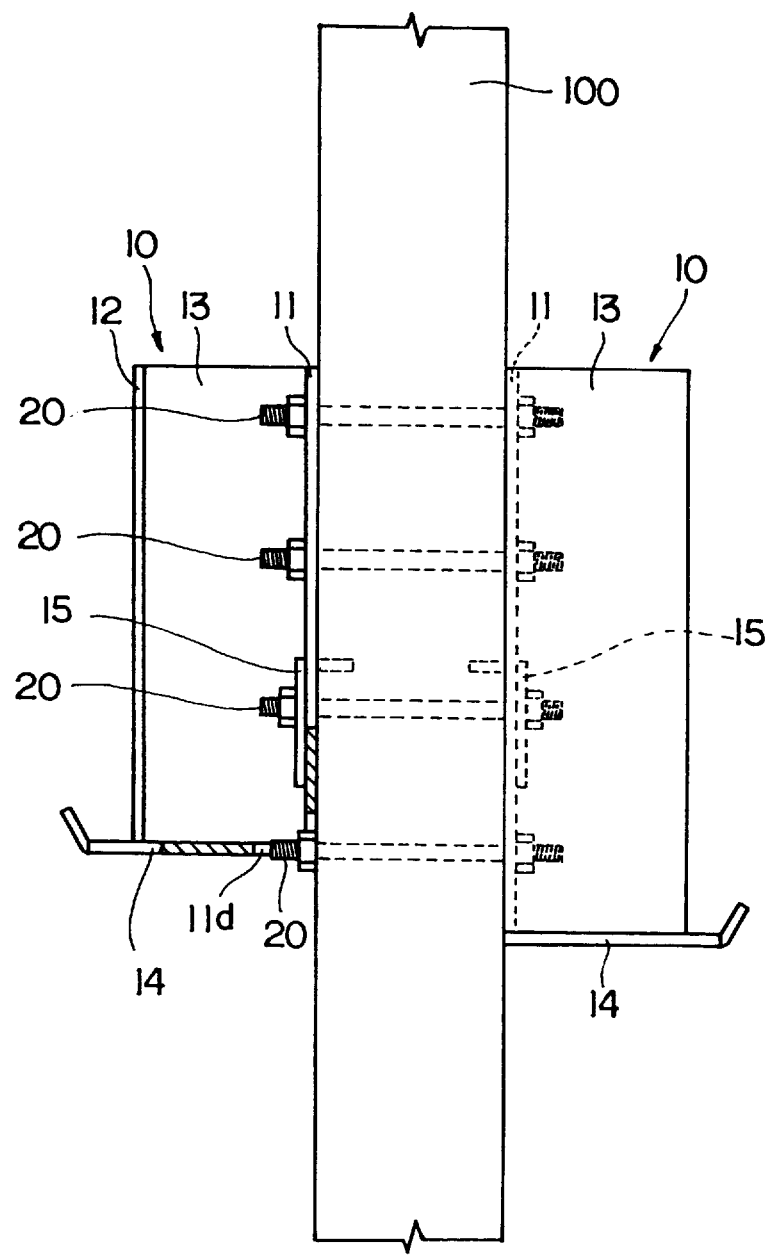
FIG. 9 is a partially cut side-view showing the condition where the main body of the jointing metal fitting of the third embodiment of the present invention is attached to a column side when wooden components are to be joined by this jointing metal fitting.

Furthermore, as shown in FIG. 8 and FIG. 9, the jointing metal fitting of this embodiment, which is a modification of the jointing metal fitting of the above-mentioned second embodiment with an increased vertical length, is provided with a wedge through-hole 11b through which the plate-like wedge 15 penetrates on the back plate 11 of the metal fitting main body 10.

Specifically, as shown in FIG. 8, the wedge through-hole 11b is provided in an optional position in the back plate 11 of the metal fitting main body 10 (in one location along the vertical direction in the back plate 11 in this embodiment) so as to allow an L-shaped wedge 15 to penetrate therethrough.

One end of this wedge 15 is driven into a wedge implantation hole formed in the column 100, not shown in the drawing, with the other end being secured to the metal fitting main body 10.

Specifically, securing holes 15a corresponding to bolt through-holes 11a of the back plate 11 are provided on the other end of the L-shaped wedge 15, as shown in FIG. 8, and the bolts of the securing means 20 for securing the back plate 11 penetrate these securing holes 15a, whereby the L-shaped wedge 15 is integrally secured to the back plate 11 and secured to the column 100.

Although two securing holes 15a are provided for the L-shaped wedge 15 in this embodiment, the number of securing holes 15a can be increased or decreased insofar as this corresponds to the number of bolt through-holes 11a in the back plate 11.

In this way, because the L-shaped plate-like wedge 15 can be driven into a wooden member such as column 100 by providing the wedge through-hole 11b on the back plate 11 of the metal fitting main body 10, the load of the beam 200 on the metal fitting main body 10 can be assumed to be dispersed by the plane of the wedge 15.

Because this not only increases the jointing force between the wooden members such as the column 100, the beam 200, and the like, but also can disperse the load of beam 200 concentrated on the securing means 20 in the wedge 15, creation of cracks or the like along the vertical direction of the bolt hole 101 through which the bolt 21 of the securing means 20 penetrates can be avoided. Especially, when a plurality of bolt holes 101 is to be provided along the vertical direction of the column 100, this arrangement can effectively prevent creation of continuous lengthwise cracks along these bolt holes 101.

In addition, the position for installing the metal fitting main body 10 and the position for jointing the beam 200 can easily be determined with certainty by arranging implantation holes for the wedge in prescribed positions on the side of the column 100 beforehand. This ensures more simple jointing operations.

Moreover, deflection of lateral members due to horizontal load on the beam 200 or the like can be avoided by securing the column 100 to the metal fitting main body 10 by horizontally driving the plate-like wedge 15 into the side of the column 100. This ensures a reinforced building which is free from vibration in the horizontal direction.

In the jointing metal fitting shown in FIG. 8, a bolt tightening hole 11d for tightening the bolt of the securing means 20 is additionally provided in the side of the bottom plate 14 at the lower end of the back plate 11 of the metal fitting main body 10.

Figure 10:
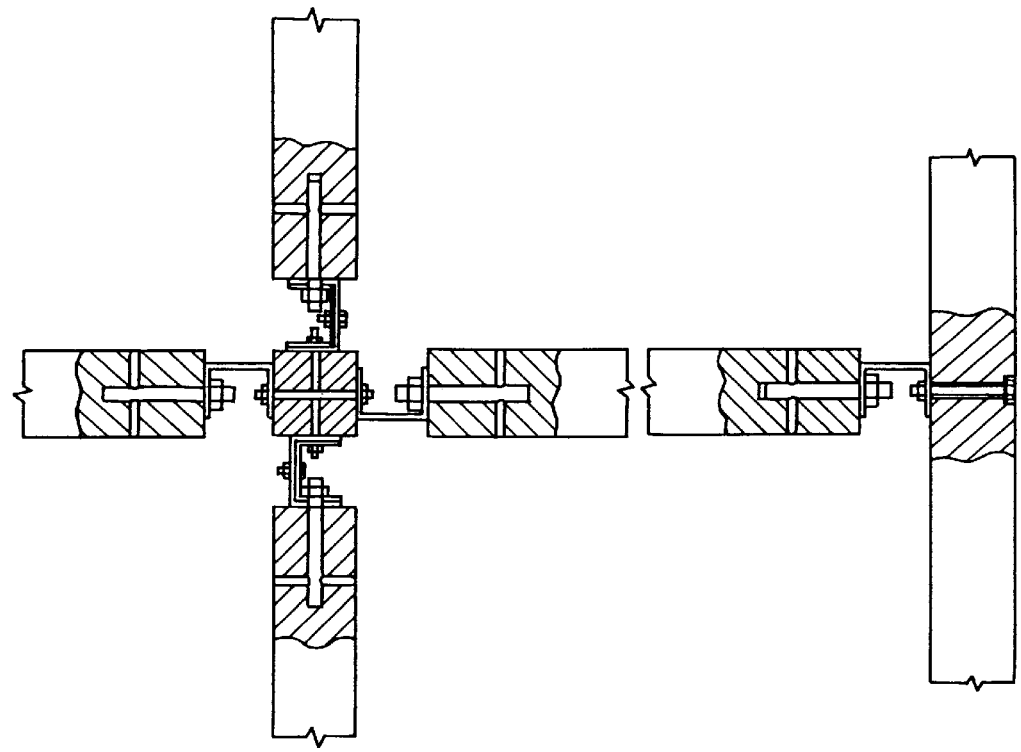
FIG. 10 is a partially cut plan showing wooden components jointed together by the jointing metal fitting of the present invention.
Figure 11:
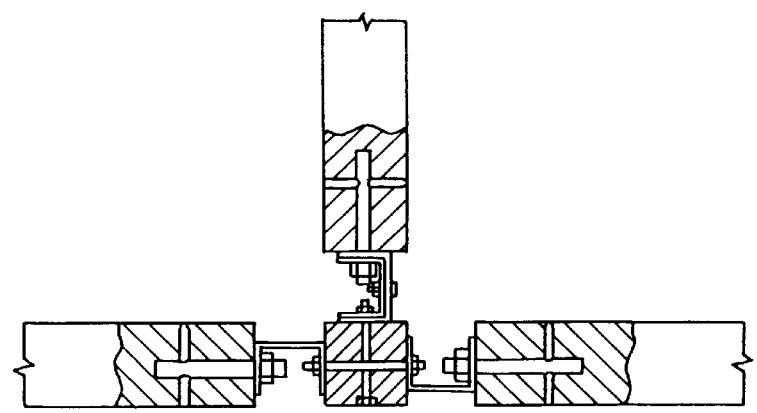
FIG. 11 is a partially cut plan showing wooden components joined together by the jointing metal fitting of the present invention.

Although the embodiment where a beam is joined to one side of a column 100 or the embodiment where two beams 200 are joined to each side of a column 100 are illustrated in the second and third embodiments, the jointing metal fitting of the present invention is not limited to these. The jointing metal fitting of the present invention can be applied to all forms of framework construction, such as the four-side shaft framework in which beams or the like are joined to all four sides of a column as shown in FIG. 10, the T-shaped shaft framework in which lateral members such as a beam and a joist are joined to one another, the three-side shaft framework in which beams or the like are joined to three sides of a column as shown in FIG. 11, and the corner shaft framework in which beams or the like are joined to a corner column which is not shown in the drawings.

Fourth embodiment

Figure 12:
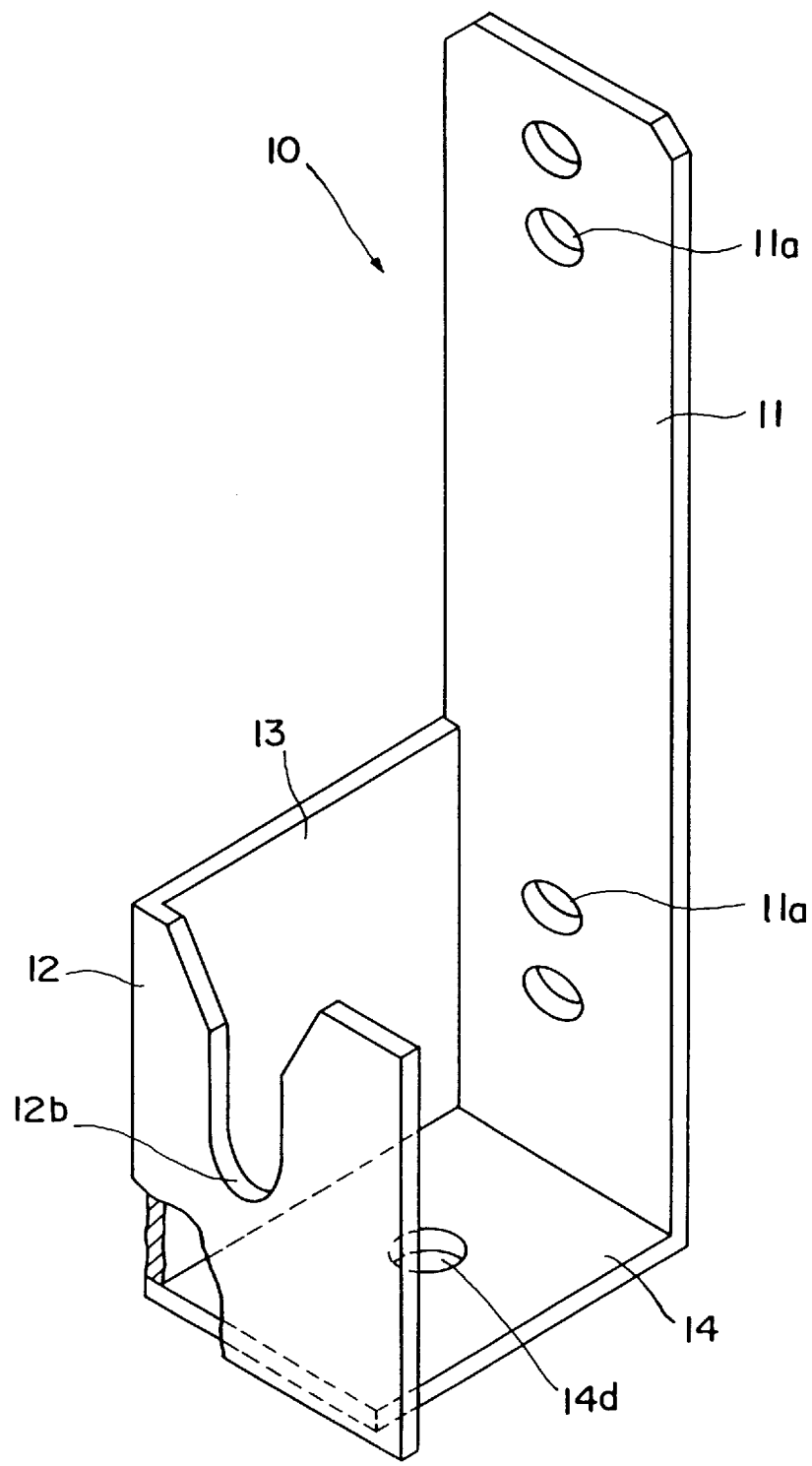
FIG. 12 is a perspective view which shows a whole metal fitting main body in the fourth embodiment of the jointing metal fitting for buildings of the present invention.
Figure 13:
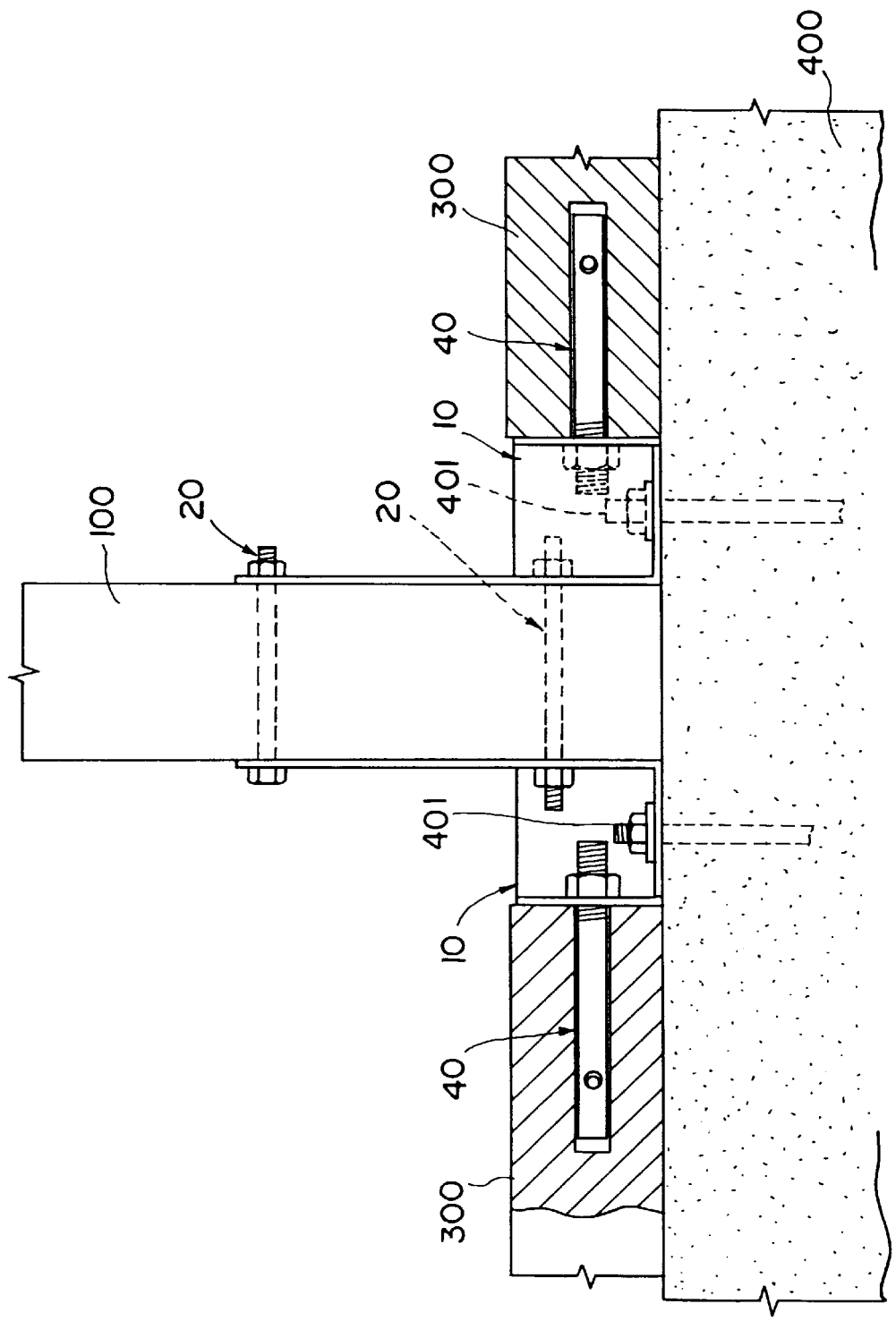
FIG. 13 is a partially cut plan view side-view showing wooden components joined together by the jointing metal fitting of the fourth embodiment of the present invention.

Next, a fourth embodiment of the jointing metal fitting for buildings of the present invention is explained referring to FIG. 12 and FIG. 13.

FIG. 12 is a partially cut perspective view which shows the metal fitting main body of the fourth embodiment of the jointing metal fitting for buildings of the present invention as a whole, and FIG. 13 is a partial cut side-view showing the condition where wooden members were jointed by the jointing metal fitting of this embodiment.

As shown in these figures, the jointing metal fitting of this embodiment is a modification of the above-mentioned jointing metal fitting of the first embodiment, and has a bottom plate 14 provided at the bottom of the metal fitting main body 10 and an anchor bolt hole 14d which penetrates this bottom plate 14 provided close to the center of the bottom plate 14.

By providing the anchor bolt hole 14d on the bottom plate 14 of the metal fitting main body 10 in this way it is possible to have the anchor bolt hole 14d penetrated by the upper end of an anchor bolt 401 driven into a foundation 400 of a building, as shown in FIG. 13, whereby the metal fitting main body 10 can be secured to the foundation 400.

In this way, by having the anchor bolt 401 penetrate the bottom plate 14, the back section 11 of the metal fitting main body 10 can be secured to the column 100 and, at the same time, the holder section 12 can be secured to a connection section of a base table 300 positioned on the foundation 400, whereby the column 100, the base table 300, and the foundation 400 can be joined integrally and firmly by this metal fitting.

Moreover, since the jointing metal fitting of this embodiment has a back section 11 to be secured to the side of column 100 in the vertical direction from the holder section 12 and the side section 13 as shown in FIG. 12, it is possible to provide a plurality of bolt through-holes 11a in the vertical direction along the back section 11, whereby it becomes possible to more firmly secure the back section 11 to the column 100.

In addition, in order to simplify the fabrication of the metal fitting main body 10 in this embodiment, the back section 11 and the bottom plate 14 are integrally formed by bending and similarly the holder section 12 and the side section 13 are integrally formed by bending. These two integral parts are welded together to form the metal fitting main body 10.

In the case where the two components are joined together to form the metal fitting main body 10 in this manner, it is desirable to have the bottom of the side section 13 mounted on the end of the upper surface of the bottom plate 14, as shown in FIG. 12, in order to assure greater integrity of the whole metal fitting.

Fifth embodiment

Figure 14:
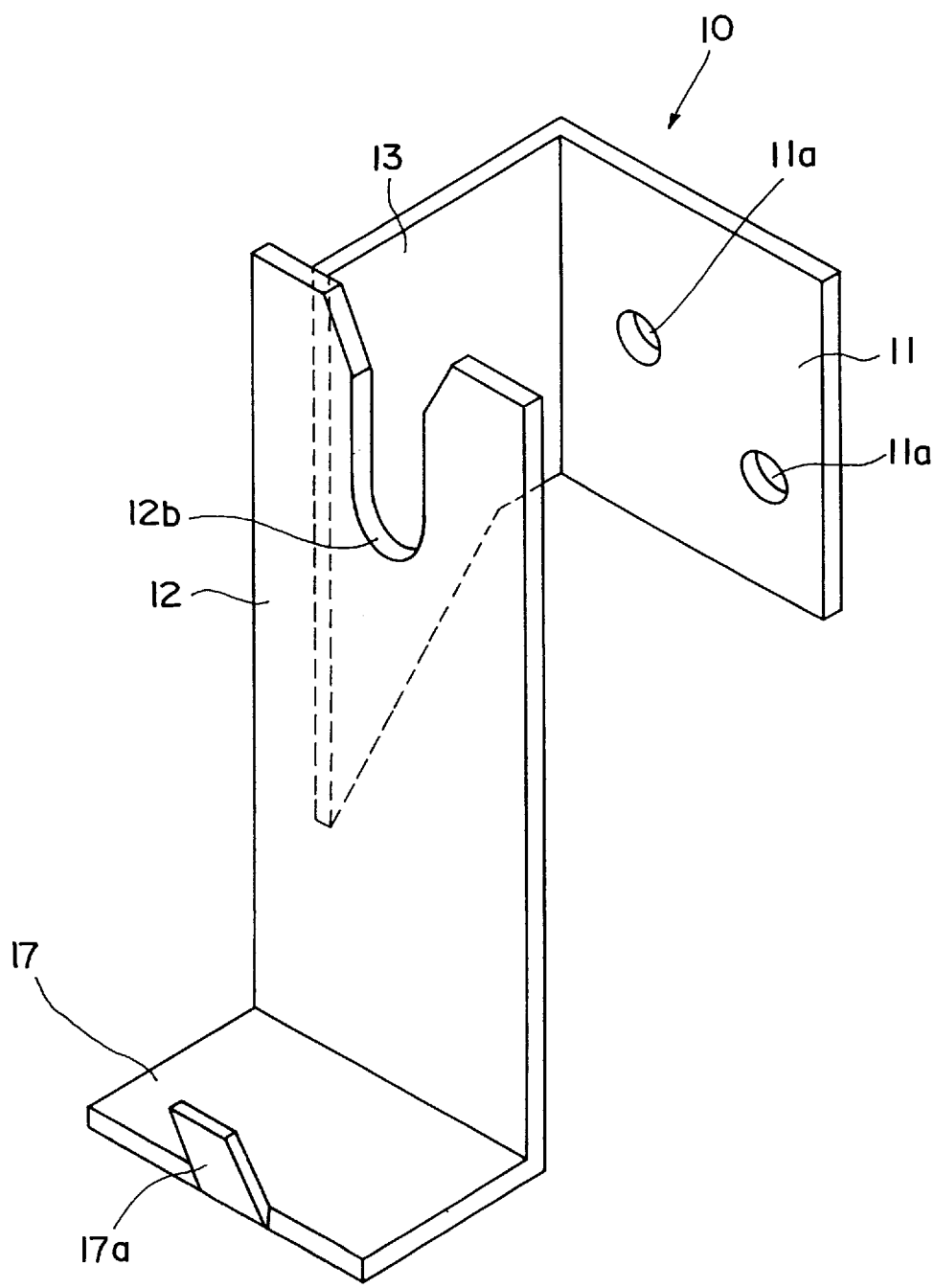
FIG. 14 is a perspective view which shows a whole metal fitting main body in the fifth embodiment of the jointing metal fitting for buildings of the present invention.
Figure 15:
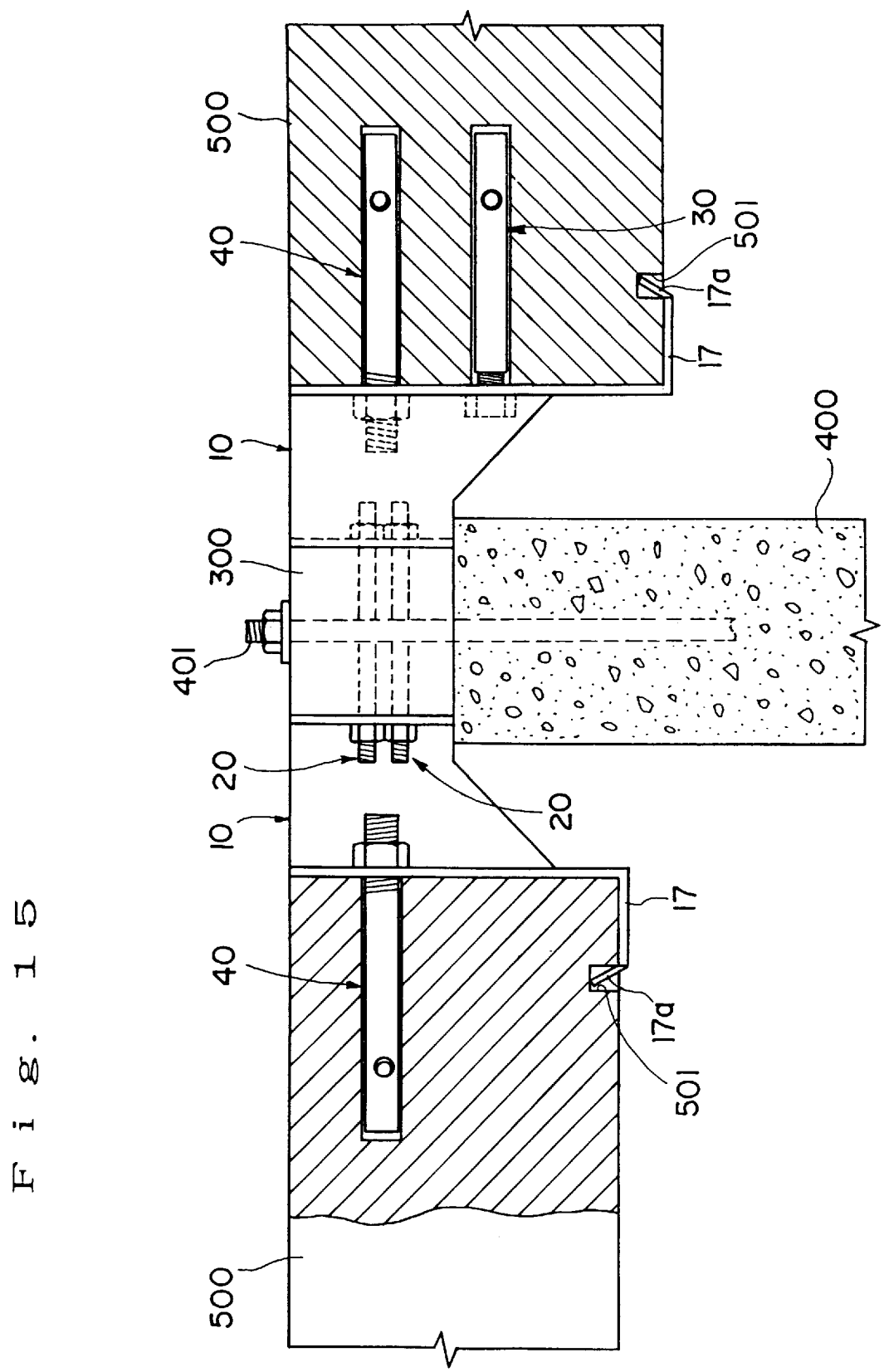
FIG. 15 is a partially cut side-view showing wooden components joined together by the jointing metal fitting of the fifth embodiment of the present invention.
Figure 16:
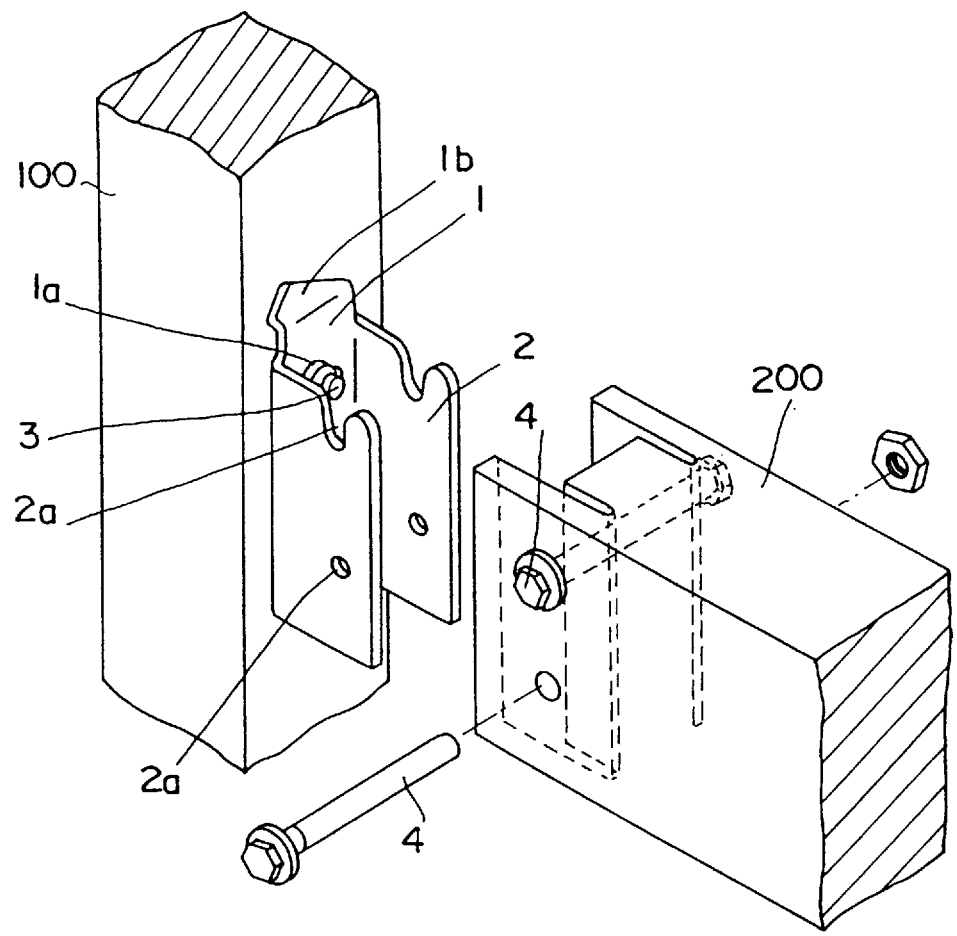
FIG. 16 is an exploded perspective view of a conventional jointing metal fitting for buildings.
Figure 17:
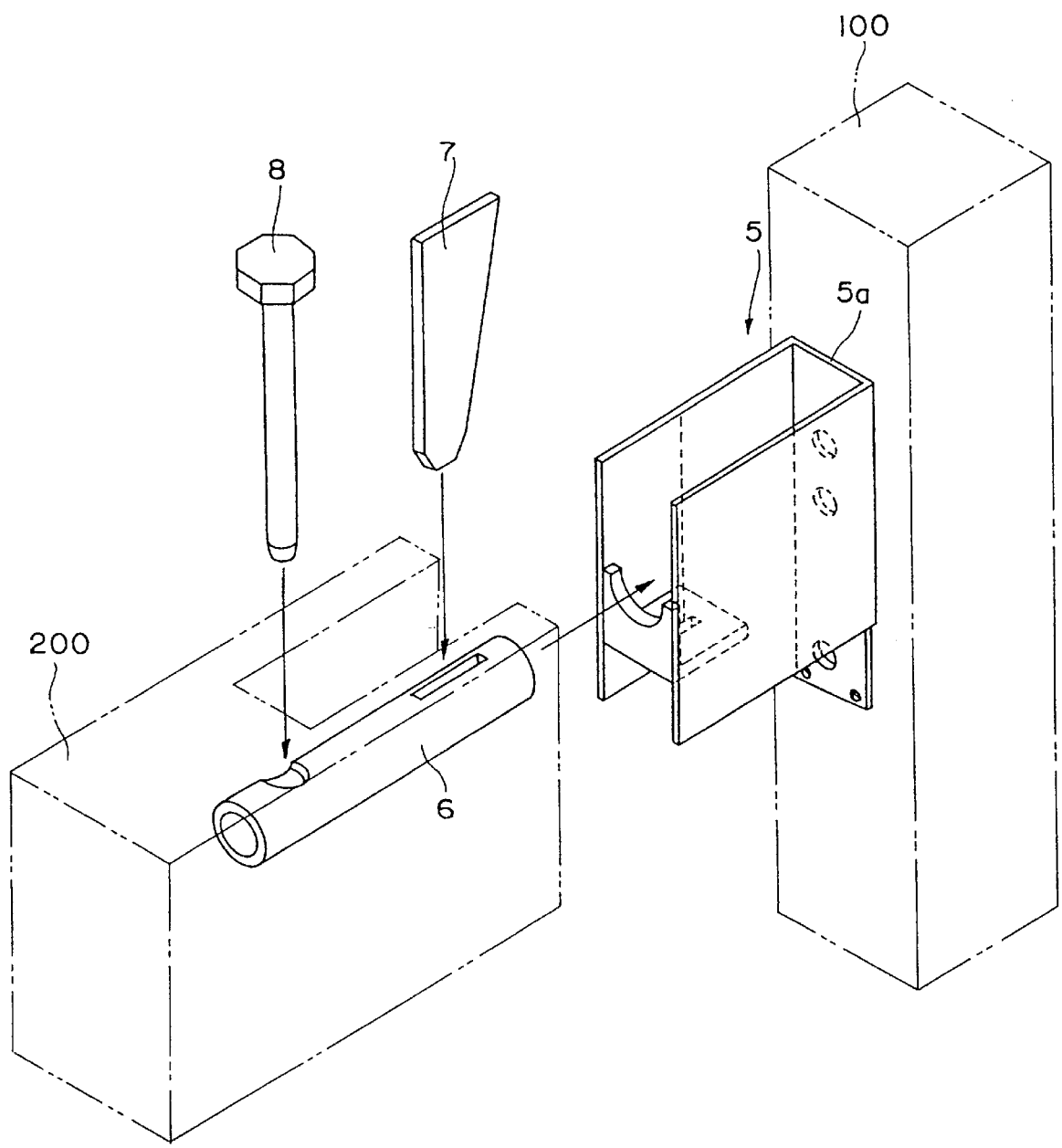
FIG. 17 is an exploded perspective view of another conventional jointing metal fitting for buildings.

Next, a fifth embodiment of the jointing metal fitting for buildings of the present invention is explained referring FIG. 14 and FIG. 15.

FIG. 14 is a perspective view which shows the whole metal fitting main body of the fifth embodiment of the jointing metal fitting for buildings of the present invention and FIG. 15 is a partial cut side-view showing the condition wherein wooden members have been jointed by the joined metal fitting of this embodiment.

As shown in these figures, the jointing metal fitting of this embodiment is a modification of the jointing metal fitting of the first embodiment which was mentioned above. In this embodiment, the lower end of the holder section 12 of the metal fitting main body 10 extends downward and also is provided with a holder plate 17 at the lower end of the holder section 12, the holder plate 17 projecting outward, i.e. in the direction opposite to the back section 11.

In addition, as shown in FIG. 14, in the holder plate 17 of the jointing metal fitting in this embodiment, a cog joint 17a similar to the cog joint 14b in the above-mentioned second embodiment is provided projecting from the end thereof. A notched section 501 with which this cog joint 17a engages is provided in the base of the connection section for a sleeper 500.

By providing the holder section 12 extended from the metal fitting main body 10 and forming a holder plate 17 at the lower end of the holder section 12 in this way as shown in FIG. 15, it becomes possible to support the bottom end of a lateral member (for example, the sleeper 500 in FIG. 15) by the holder plate 17.

In this manner, the back section 11 of the metal fitting main body 10 is secured to a side of the base table 300 on a foundation 400 by the securing means 20 and, at the same time, the holder section 12 is secured to the connection section of the sleeper 500 by the employment axial dowel 40 or the employment pipe dowel 30, as shown in FIG. 15, whereby the base table 300 and the sleeper 500 can be joined securely under the condition whereby the holder plate 17 tightly supports the bottom of the sleeper 500.

The length to which the holder section 12 extends downward is adjusted to conform to the height of the lateral members such as the sleeper 500 or the like which are to be joined.

It is possible to increase or decrease the number of employment pipe dowels 30 or the employment axial dowel 40 for securing the holder section 12 to the wooden members, e.g. one to one or as shown in FIG. 15, corresponding to the length of the extended holder section 12, the height of the joined lateral members, and the like (in FIG. 15, one employment axial dowel 40 for the left metal fitting in the drawing and one employment axial dowel 40 and one employment pipe dowel 30 for the right metal fitting in the drawing are shown).

Heretofore, lateral wooden members such as a sleeper supporting a floor of a building, have required a supporting means which consists of a bundle column or a bundle stone for supporting the bottom of such lateral wooden members.

A problem with this supporting means such as a bundle column and the like is that complicated installation is necessary which requires the skilled labor of carpenters and a high cost for the installation.

The jointing metal fitting of this embodiment which is provided with the holder plate 17 for holding the base of lateral wooden members such as the sleeper 500 or the like makes it possible for the lateral wooden members such as the sleeper 500 which conventionally requires a means for support from the bottom to be firmly joined to a column or the like without such supporting means.

This not only makes the jointing work easy but also decreases the cost of the installation.

Since the back section 11 of the metal fitting main body 10 is secured to the base table 300 of the foundation 400 in the jointing metal fitting of this embodiment as shown in FIG. 15, it is necessary for the securing means 20 to avoid interference with the anchor bolt 401 that penetrates the center of the base table 300.

For this reason, the bolt through-hole 11a are provided at a position offset from the center line in the vertical direction of the back section 11 as shown in FIG. 14.

The first, second, and third embodiments discussed above are almost applicable to the features of the jointing metal fitting of this embodiment such as the construction, the means for securing wooden components, and the like.

Because the jointing metal fitting of this embodiment has the holder section 12 of the metal fitting main body 10 extended further downward than in the other embodiments, to make fabrication easy the back section 11 and the side section 13 are integrally formed by bending and the holder section 12 and the holder plate 17 are also integrally formed by bending, and the two integral portions are combined by welding and the like.

Moreover, in order to assure the integrity of these portions of the jointing metal fitting combined by welding or the like in this embodiment, the length of the side section 13 secured to the holder section 12 is made greater to increase the length along which these parts are welded as shown in FIG. 14.

As illustrated above, wooden members can be strongly and firmly joined using the jointing metal fitting of the present invention with a simple structure without requiring a complicated and difficult process for producing connections such as a groove. Only an extremely simple connection process is needed, and with an easy, certain, and safe operation can join, the wooden members can be joined without producing any gaps between them.

I claim:

1. A jointing metal fitting for joining wooden members in buildings comprising:

a metal fitting main body having a U-shaped cross section which comprises a plate-like back section adapted to be secured to a first wooden member, a plate-like holder section adapted to be secured to a second wooden member, and a plate-like side section which links a side of the back section and a side of the holder section, an axial securing groove formed in the holder section and having an upper part opened to an upper end of the holder section, securing means adapted to secure the back section of the metal fitting main body to said first wooden member, and first axial securing means engaging the axial securing groove adapted to secure said second wooden member to the holder section of the metal fitting main body.

2. The jointing metal fitting for buildings according claim 1, further comprising second axial securing means, said holder section of the metal fitting main body having a securing hole through which said second axial securing means passes.

3. The jointing metal fitting for buildings according to claim 2 wherein said second axial securing means comprises:

an axial member threaded around an outer periphery at one end and having a pinhole penetrating at right angles to an axial direction at the other end, the axial member being adapted to be inserted into an insert hole formed in a connection section of said second wooden member from this other end, a nut threadedly engaging the axial member, and a through-hole pin adapted to be driven into a side of said second wooden member, said through-hole pin penetrating the pinhole of said axial member.

4. The jointing metal fitting for buildings according to claim 1, wherein said first axial securing means comprises:

an axial member having at least one hollow end, a thread formed around an inner periphery at one end and a pinhole penetrating at right angles to an axial direction at the other end, the axial member being adapted to be inserted into an insert hole formed in a connection section of said second wooden member from this other end, a bolt threadedly engaging the axial member, and a through-hole pin adapted to be driven into a side of said second wooden member, said through-hole pin penetrating the pinhole of said axial member.

5. The jointing metal fitting for buildings according to claim 1, wherein the metal fitting main body is provided with a bottom plate covering a base thereof, said bottom plate projecting from a holder section side of the metal fitting main body adapted to hold a lower end of a connection section of said second wooden member and having a barb inclined upward at a tip thereof.

6. The jointing metal fitting for buildings according to claim 1, wherein the metal fitting main body is provided with a bottom plate covering a base thereof, and having an anchor bolt hole.

7. The jointing metal fitting for buildings according to claim 1, wherein the holder section extends downward, and is provided with a holder plate outwardly projecting from a lower end of the holder section, and a projecting barb inclined upward at an upper end of this holder plate.

* * * * *